(12) United States Patent
Army et al.

(10) Patent No.: US 10,533,784 B2
(45) Date of Patent: Jan. 14, 2020

(54) PACK-AND-A-HALF ARCHITECTURE FOR ENVIRONMENTAL CONTROL SYSTEMS

(71) Applicant: Hamilton Sundstrand Corporation, Windsor Locks, CT (US)

(72) Inventors: Donald E. Army, Enfield, CT (US); Frederick Peacos, III, North Scituate, RI (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 632 days.

(21) Appl. No.: 15/239,280

(22) Filed: Aug. 17, 2016

(65) Prior Publication Data
US 2017/0268838 A1 Sep. 21, 2017

Related U.S. Application Data

(60) Provisional application No. 62/309,080, filed on Mar. 16, 2016, provisional application No. 62/309,084, (Continued)

(51) Int. Cl.
*F25B 43/00* (2006.01)
*B64D 13/06* (2006.01)
(Continued)

(52) U.S. Cl.
CPC .............. *F25B 43/00* (2013.01); *B64D 13/02* (2013.01); *B64D 13/06* (2013.01); *B64D 13/08* (2013.01);
(Continued)

(58) Field of Classification Search
CPC ........ B64D 13/02; B64D 13/08; B64D 13/06; B64D 2013/0618; B64D 2013/064;
(Continued)

(56) References Cited

U.S. PATENT DOCUMENTS 2,653,585 A 9/1953 Wallace
2,767,561 A * 10/1956 Seeger ................... B64D 13/06
417/406
(Continued)

FOREIGN PATENT DOCUMENTS

DE 102011013184 A1 9/2012
EP 0371082 A1 6/1990
(Continued)

OTHER PUBLICATIONS

European Search Report, European Application No. 171609191, dated Jul. 27, 2017, European Patent Office; European Search Report 8 pages.

*Primary Examiner* — Kun Kai Ma
(74) *Attorney, Agent, or Firm* — Cantor Colburn LLP

(57) ABSTRACT

Environmental control system for aircraft are provided having a ram module having a primary heat exchanger and a secondary heat exchanger, a refrigeration module having an air cycle machine module and a condenser heat exchanger module, and at least one conduit fluidly connecting the ram module to the refrigeration module such that the ram module and the refrigeration module can be installed in two separate volumes of the aircraft.

18 Claims, 9 Drawing Sheets

Related U.S. Application Data filed on Mar. 16, 2016, provisional application No. 62/309,081, filed on Mar. 16, 2016, provisional application No. 62/309,076, filed on Mar. 16, 2016.

(51) Int. Cl.
| | |
|---|---|
| *B64D 13/02* | (2006.01) |
| *B64D 13/08* | (2006.01) |
| *F25B 9/06* | (2006.01) |
| *F28F 27/02* | (2006.01) |
| *F28F 17/00* | (2006.01) |

(52) U.S. Cl.
CPC .............. *F25B 9/06* (2013.01); *F28F 17/005* (2013.01); *F28F 27/02* (2013.01); *B64D 2013/064* (2013.01); *B64D 2013/0618* (2013.01); *B64D 2013/0648* (2013.01); *B64D 2013/0688* (2013.01); *F25B 2500/13* (2013.01); *F28F 2250/06* (2013.01)

(58) Field of Classification Search
CPC .... B64D 2013/0648; B64D 2013/0688; Y02T 50/56; Y02T 50/44
See application file for complete search history.

(56) References Cited

U.S. PATENT DOCUMENTS

| | | | |
|---|---|---|---|
| 3,547,379 A | 12/1970 | Kappus et al. | |
| 4,930,571 A | 6/1990 | Paull | |
| 5,461,882 A * | 10/1995 | Zywiak | B60H 1/00007 62/401 |
| 5,511,385 A * | 4/1996 | Drew | B64D 13/06 62/172 |
| 5,704,218 A * | 1/1998 | Christians | B64D 13/06 62/172 |
| 5,768,896 A | 6/1998 | Kline et al. | |
| 5,784,894 A | 7/1998 | Army et al. | |
| 6,070,418 A | 6/2000 | Crabtree et al. | |
| 6,257,003 B1 | 7/2001 | Hipsky | |
| 6,526,775 B1 | 3/2003 | Asfia et al. | |
| 6,942,183 B2 | 9/2005 | Zywiak | |
| 6,981,388 B2 | 1/2006 | Brutscher et al. | |
| 7,188,488 B2 | 3/2007 | Army et al. | |
| 7,467,524 B2 | 12/2008 | Brutscher et al. | |
| 7,490,662 B2 | 2/2009 | Eliades et al. | |
| 7,757,502 B2 | 7/2010 | Merritt et al. | |
| 8,132,758 B2 | 3/2012 | Army et al. | |
| 8,272,930 B2 | 9/2012 | Klimpel et al. | |
| 8,347,647 B2 | 1/2013 | McAuliffe et al. | |
| 8,800,637 B2 | 8/2014 | Bourgoin et al. | |
| 8,839,641 B1 | 9/2014 | Plattner | |
| 8,961,114 B2 | 2/2015 | Ruthemeyer | |
| 9,254,920 B2 * | 2/2016 | Zhou | F02C 6/08 |
| 9,267,716 B2 | 2/2016 | Song et al. | |
| 9,377,225 B2 | 6/2016 | Song et al. | |
| 9,669,936 B1 * | 6/2017 | Fiterman | B64D 13/06 |
| 2004/0014419 A1 * | 1/2004 | Lents | B64D 13/06 454/237 |
| 2004/0177639 A1 * | 9/2004 | Army, Jr. | B64D 13/08 62/402 |
| 2005/0103464 A1 | 5/2005 | Taylor | |
| 2005/0115404 A1 * | 6/2005 | Leigh | B01D 53/0454 95/11 |
| 2007/0113579 A1 * | 5/2007 | Claeys | B64D 13/02 62/401 |
| 2007/0271952 A1 * | 11/2007 | Lui | B64D 13/06 62/402 |
| 2008/0110193 A1 * | 5/2008 | Jonqueres | B64D 13/06 62/331 |
| 2008/0110603 A1 * | 5/2008 | Fellague | B64D 13/00 165/140 |
| 2009/0230243 A1 * | 9/2009 | Army | B64C 7/00 244/118.5 |
| 2009/0293478 A1 | 12/2009 | Takahashi et al. | |
| 2013/0097996 A1 | 4/2013 | Rosen et al. | |
| 2013/0160472 A1 | 6/2013 | Klimpel et al. | |
| 2013/0277009 A1 | 10/2013 | Army | |
| 2013/0344790 A1 * | 12/2013 | Army | B64D 13/06 454/152 |
| 2014/0048229 A1 | 2/2014 | Cuthbert | |
| 2014/0083647 A1 | 3/2014 | Army et al. | |
| 2014/0124160 A1 | 5/2014 | Houssaye et al. | |
| 2014/0199931 A1 * | 7/2014 | Hipsky | B64D 13/08 454/76 |
| 2014/0262200 A1 | 9/2014 | Sheppard et al. | |
| 2014/0331692 A1 * | 11/2014 | Eowsakul | F04B 39/066 62/56 |
| 2014/0352348 A1 * | 12/2014 | Army, Jr. | B64D 13/006 62/401 |
| 2015/0059356 A1 * | 3/2015 | Bruno | B64D 13/06 60/785 |
| 2015/0059397 A1 * | 3/2015 | Bruno | B64D 13/06 62/402 |
| 2015/0166187 A1 * | 6/2015 | Durbin | B64D 13/08 62/79 |
| 2015/0246729 A1 | 9/2015 | Ng | |
| 2015/0251765 A1 * | 9/2015 | Jonqueres | B64D 13/08 62/86 |
| 2015/0251766 A1 * | 9/2015 | Atkey | B64D 13/08 244/13 |
| 2015/0307196 A1 | 10/2015 | Bruno | |
| 2015/0314877 A1 * | 11/2015 | McAuliffe | F02C 6/08 62/61 |
| 2016/0047561 A1 | 2/2016 | Army | |
| 2016/0229541 A1 | 8/2016 | Bruno et al. | |
| 2016/0231031 A1 * | 8/2016 | Bruno | B64D 13/06 |
| 2016/0288912 A1 * | 10/2016 | Richardson | B64D 13/00 |
| 2016/0347456 A1 * | 12/2016 | Bruno | B64D 13/06 |
| 2017/0060125 A1 * | 3/2017 | Beaven | G05B 23/0235 |
| 2017/0355466 A1 | 12/2017 | Galzin et al. | |

FOREIGN PATENT DOCUMENTS

| | | |
|---|---|---|
| EP | 1283165 A2 | 2/2003 |
| EP | 1464575 A1 | 10/2004 |
| EP | 2808256 A1 | 12/2014 |
| EP | 2845803 A1 | 3/2015 |
| EP | 2937287 A1 | 10/2015 |
| EP | 2985224 A1 | 2/2016 |
| GB | 2015723 A | 9/1979 |
| WO | 9203338 A1 | 3/1992 |
| WO | 9737890 A1 | 10/1997 |

* cited by examiner

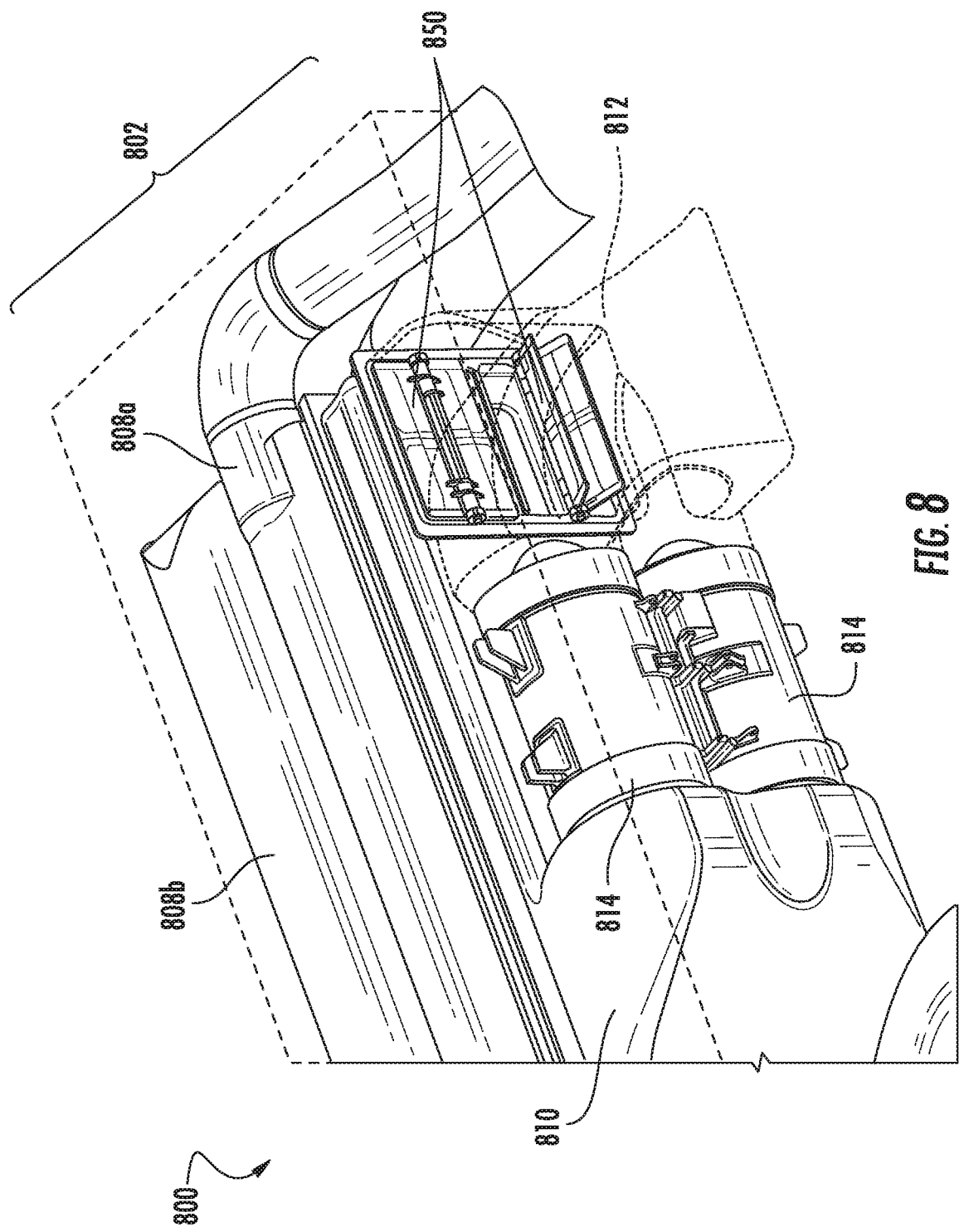

PACK-AND-A-HALF ARCHITECTURE FOR ENVIRONMENTAL CONTROL SYSTEMS

CROSS-REFERENCE TO RELATED APPLICATIONS

The present application claims priority from U.S. Provisional Patent Application Nos. 62/309,076, 62/309,080, 62/309,081, and 62/309,084, filed on Mar. 16, 2016. The contents of the priority applications are hereby incorporated by reference in their entireties.

BACKGROUND

The subject matter disclosed herein generally relates to environmental control systems and, more particularly, to pack-and-a-half architectures for environmental control systems.

Commercial aircraft are conventionally equipped with two-pack environmental control system architectures that include redundant packs installed in separate bays beneath a center wing box of the aircraft and are encapsulated by the aircraft wing-to-body fairing. These bays are commonly separated by a Keel Beam that supports the weight of the aircraft in the event of a wheels-up landing. Local penetrations of the keel beam can be accommodated if properly reinforced.

Smaller configurations of environmental control system architectures can include pack-and-a-half architectures that fit within a single volume. However, such volume is larger than half of the convention two-pack architectures, and thus the pack-and-a-half architecture systems may be too large for use in such locations, and thus may be required to be installed in other locations of the aircraft (e.g., in a tail cone of the aircraft). It may be beneficial to further reduce the size of pack-and-a-half environmental control system architectures.

SUMMARY

According to one embodiment, environmental control systems for an aircraft are provided. The environmental control systems include a ram module having a primary heat exchanger and a secondary heat exchanger, a refrigeration module having an air cycle machine module and a condenser heat exchanger module, and at least one conduit fluidly connecting the ram module to the refrigeration module such that the ram module and the refrigeration module can be installed in two separate volumes of the aircraft.

In addition to one or more of the features described above, or as an alternative, further embodiments of the environmental control systems may include that the condenser heat exchanger module includes a condenser heat exchanger having a bypass valve wherein the bypass valve is selectively operable to divert air from the condenser heat exchanger directly to a cabin of the aircraft.

In addition to one or more of the features described above, or as an alternative, further embodiments of the environmental control systems may include that the condenser heat exchanger module includes a condenser heat exchanger that conditions air received from turbines of the air cycle machine module to supply the conditioned air to a cabin of the aircraft.

In addition to one or more of the features described above, or as an alternative, further embodiments of the environmental control systems may include that the condenser heat exchanger module includes a recirculated air inlet to receive recirculated air from the cabin of the aircraft and mixes the recirculated air with air from the turbines of the air cycle machine module.

In addition to one or more of the features described above, or as an alternative, further embodiments of the environmental control systems may include that the condenser heat exchanger module includes compact mixer configured to mix the recirculated air and the air from the turbines of the air cycle machine module.

In addition to one or more of the features described above, or as an alternative, further embodiments of the environmental control systems may include that the compact mixer includes recirculated air injectors and at least one torus to mix the recirculated air and the air from the turbines of the air cycle machine module.

In addition to one or more of the features described above, or as an alternative, further embodiments of the environmental control systems may include that the condenser heat exchanger module includes a condenser heat exchanger and a differential pressure sensor configured to monitor a pressure differential between air supplied from the turbines of the air cycle machine module and air supplied to a cabin of the aircraft.

In addition to one or more of the features described above, or as an alternative, further embodiments of the environmental control systems may include that the ram module comprises at least one fan configured to control airflow through the primary and secondary heat exchangers of the ram module.

In addition to one or more of the features described above, or as an alternative, further embodiments of the environmental control systems may include that the fans are electric fans.

In addition to one or more of the features described above, or as an alternative, further embodiments of the environmental control systems may include that the fans are one of fixed speed, two speed, or variable speed fans.

In addition to one or more of the features described above, or as an alternative, further embodiments of the environmental control systems may include that the ram module comprises at least one fan bypass check valve to enable air to bypass the fans.

According to other embodiments, aircraft are provided. The aircraft include an environmental control system having a ram module having a primary heat exchanger and a secondary heat exchanger, a refrigeration module having an air cycle machine module and a condenser heat exchanger module, and at least one conduit fluidly connecting the ram module to the refrigeration module such that the ram module and the refrigeration module can be installed in two separate volumes of the aircraft.

In addition to one or more of the features described above, or as an alternative, further embodiments of the aircraft may include that the condenser heat exchanger module includes a condenser heat exchanger having a bypass valve wherein the bypass valve is selectively operable to divert air from the condenser heat exchanger directly to a cabin of the aircraft.

In addition to one or more of the features described above, or as an alternative, further embodiments of the aircraft may include that the condenser heat exchanger module includes a condenser heat exchanger that conditions air received from turbines of the air cycle machine module to supply the conditioned air to a cabin of the aircraft.

In addition to one or more of the features described above, or as an alternative, further embodiments of the aircraft may include that the condenser heat exchanger module includes a recirculated air inlet to receive recirculated air from the cabin of the aircraft and mixes the recirculated air with air from the turbines of the air cycle machine module.

In addition to one or more of the features described above, or as an alternative, further embodiments of the aircraft may include that the condenser heat exchanger module includes compact mixer configured to mix the recirculated air and the air from the turbines of the air cycle machine module.

In addition to one or more of the features described above, or as an alternative, further embodiments of the aircraft may include that the condenser heat exchanger module includes a condenser heat exchanger and a differential pressure sensor configured to monitor a pressure differential between air supplied from the air cycle machines and air supplied to a cabin of the aircraft.

In addition to one or more of the features described above, or as an alternative, further embodiments of the aircraft may include that the ram module comprises at least one fan configured to control airflow through the primary and secondary heat exchangers of the ram module.

In addition to one or more of the features described above, or as an alternative, further embodiments of the aircraft may include that the fans are one of fixed speed, two speed, or variable speed fans.

In addition to one or more of the features described above, or as an alternative, further embodiments of the aircraft may include that the ram module comprises at least one fan bypass check valve selectively openable to enable air to bypass the fans.

Technical effects of embodiments of the present disclosure include environmental control systems having pack-and-a-half architectures.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 8 is a schematic illustration of a portion of a ram module of an environmental control system in accordance with an embodiment of the present disclosure.

DETAILED DESCRIPTION

Figure 1A:
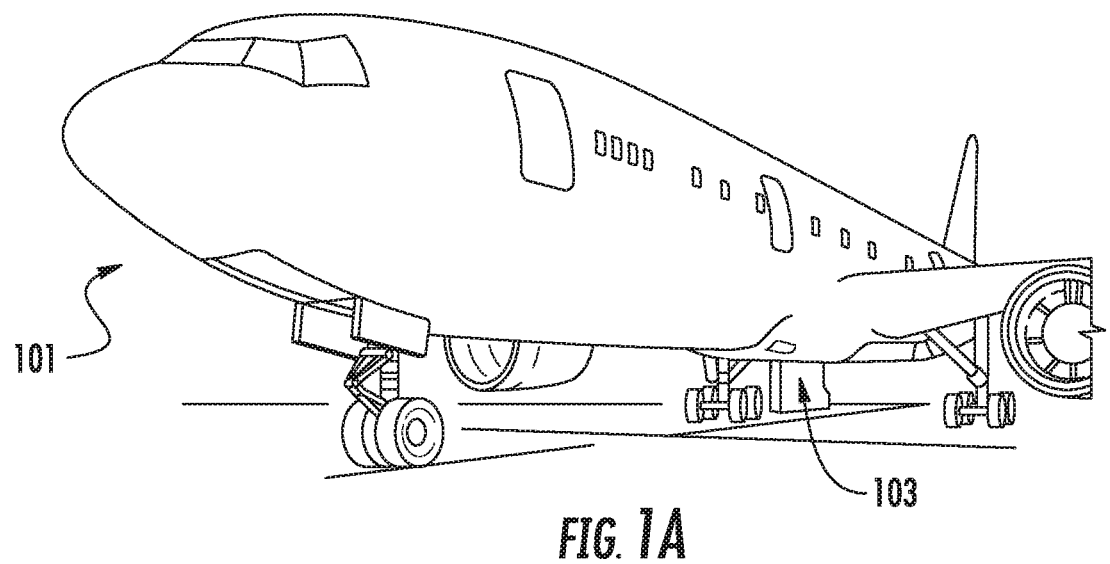
FIG. 1A is a schematic illustration of an aircraft that can incorporate various embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "##" that is shown in FIG. X may be labeled "X##" and a similar feature in FIG. Z may be labeled "Z##." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1B:
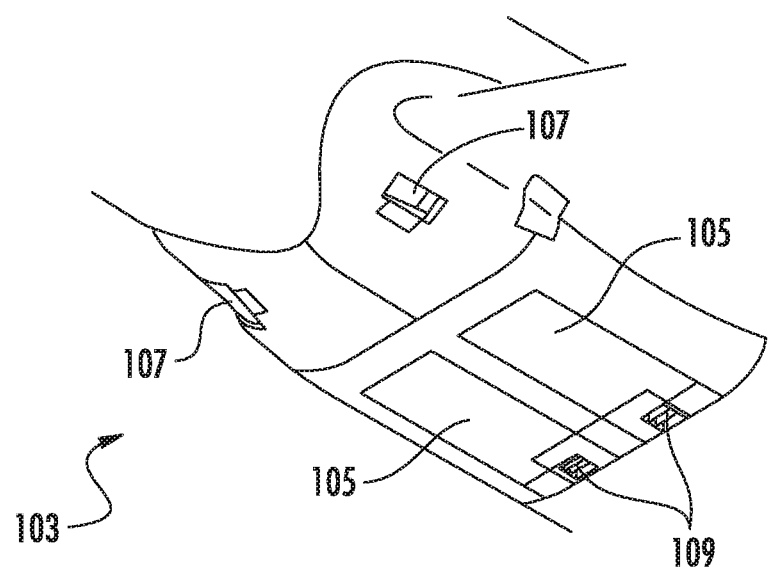
FIG. 1B is a schematic illustration of a bay section of the aircraft of FIG. 1A.

As shown in FIGS. 1A-1B, an aircraft 101 can include one or more bays 103 beneath a center wing box. The bay 103 can contain and/or support one or more components of the aircraft 101. For example, in some configurations, the aircraft 101 can include environmental control systems within the bay 103. As shown in FIG. 1B, the bay 103 includes bay doors 105 that enable installation and access to one or more components (e.g., environmental control systems). During operation of environmental control systems, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, etc.). Some air may be exhaust through one or more ram air exhaust outlets 109.

Figure 2A:
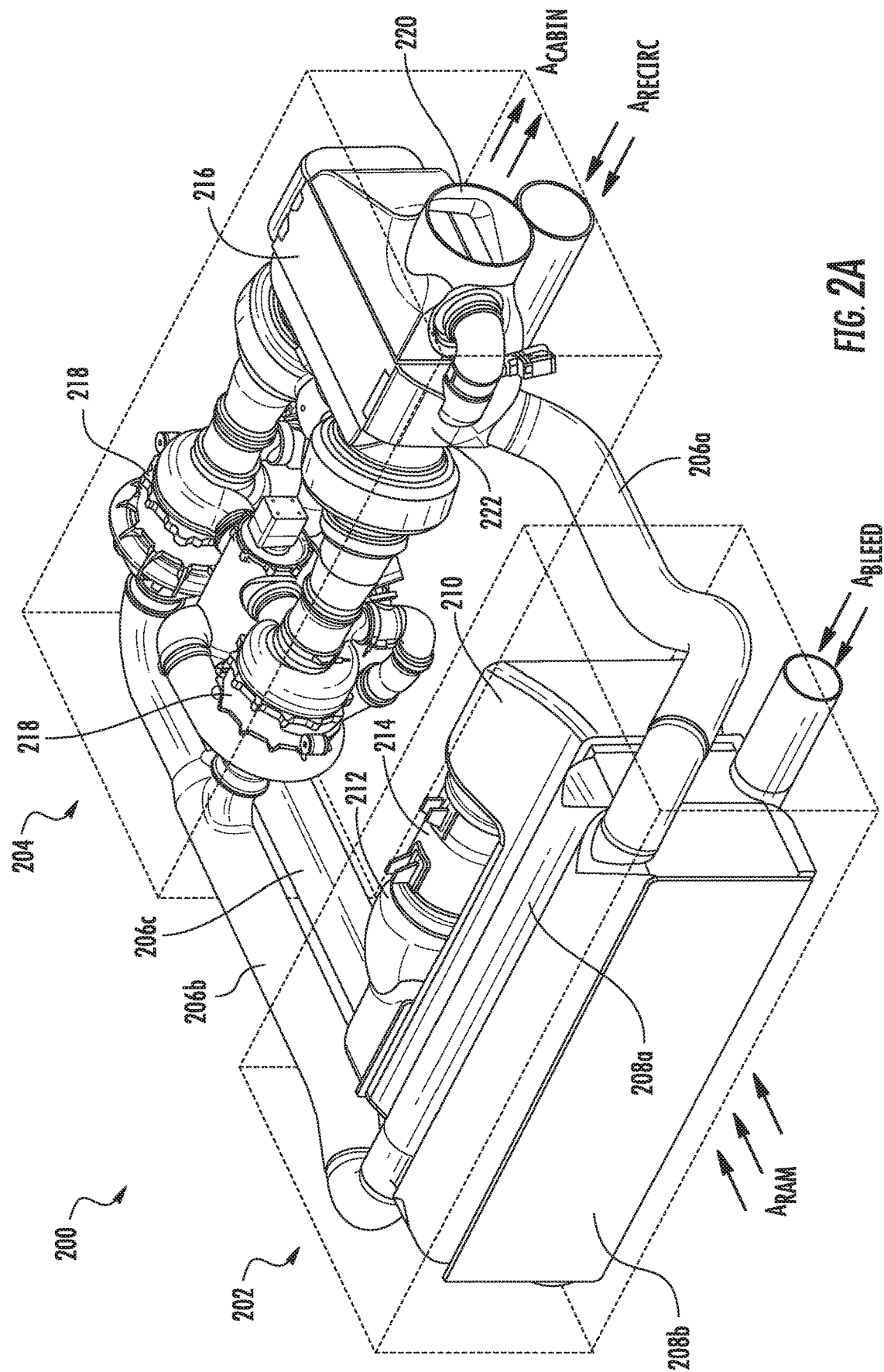
FIG. 2A is a schematic, perspective illustration of an environmental control system of an aircraft that can incorporate embodiments of the present disclosure.
Figure 2B:
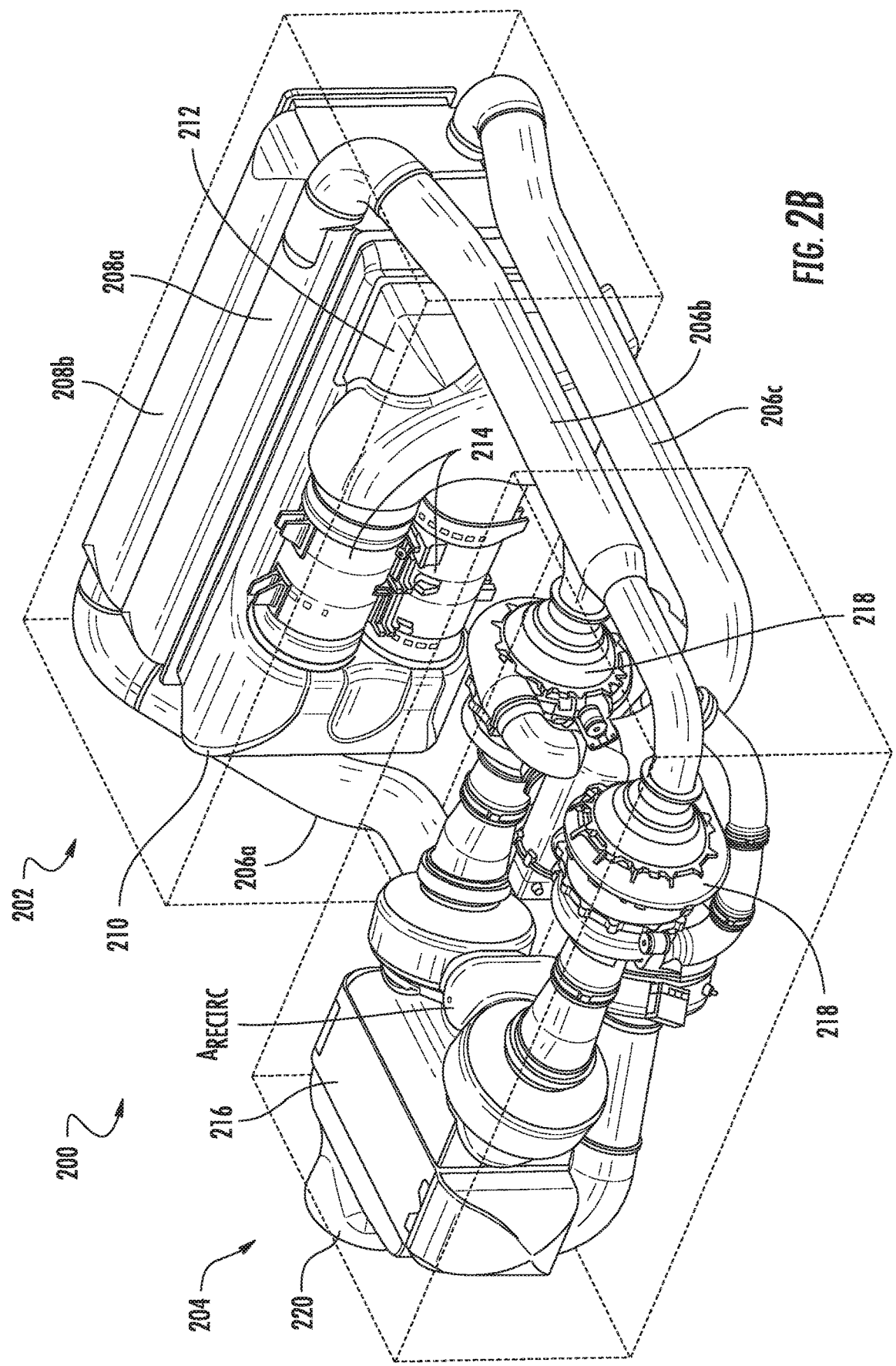
FIG. 2B is a second perspective illustration of the environmental control system of FIG. 2A.

Turning now to FIGS. 2A-2B, an environmental control system 200 in accordance with an embodiment of the present disclosure is shown. The environmental control system 200 includes a ram module 202 and a refrigeration module 204 that are operably connected by one or more ducts 206a, 206b, 206c. FIG. 2A shows a first perspective illustration of the environmental control system 200 and FIG. 2B shows a second perspective illustration of the environmental control system 200. The environmental control system 200 of FIGS. 2A-2B is merely for illustrative and explanatory purposes, and those of skill in the art will appreciate that various embodiments of the present disclosure can be configured with different types of environmental control systems and/or different configurations of environmental control systems, and thus, the present discussion and associated illustrations are not intended to be limiting.

As shown, in FIGS. 2A-2B, the ram module 202 includes a primary heat exchanger 208a and a secondary heat exchanger 208b that form a two-pass heat exchanger module. The heat exchangers 208a, 208b are configured to receive ram air $A_{ram}$ and bleed air $A_{bleed}$ to condition air within the ram module 202. The ram module 202 further includes a ram outlet header 210 and a ram exhaust header 212. Located between the headers 210, 212 may be one or more ram fans 214. Air from the ram module 202 can be conveyed to or from the refrigeration module 204 through the ducts 206a, 206b, 206c.

The refrigeration module 204 includes a condenser heat exchanger 216 and one or more air cycle machines 218. The condenser heat exchanger 216 can be operably connected to the secondary heat exchanger 208b by a first duct 206a that can supply hot air to the condenser heat exchanger 216. The air cycle machines 218 can be connected to one or both of the heat exchangers 208a, 208b, as shown. Recirculated air $A_{recirc}$ can be supplied to and mix with turbine outlet air from the air cycle machines 218 as indicated in FIG. 2A.

The condenser heat exchanger 216 is configured to condition air and supply relatively cool or cold air to a cabin of an aircraft as cabin supply air $A_{cabin}$. Thus, the condenser heat exchanger 216 includes an outlet header 220. The hot air that is supplied to the condenser heat exchanger 216 through the duct 206a is fed into an inlet header 222 of the condenser heat exchanger 216.

As shown in FIGS. 2A-2B, the ram fans 214 and the air cycle machines 218 are separated. Such a configuration enables the separation of the environmental control system 200 to be separated into the ram module 202 and the refrigeration module 204. As shown, the ram module 202 includes the ram fans 214. In some embodiments, the ram fans 214 can be configured as dual electric ram rams that can provide a required ram cooling performance and redundancy. The ram fans 214 can be operated separately or at the same time to enable control and variance in ram flow. Fixed speed fans, two speed fans, or variable speed fans can be used without departing from the scope of the present disclosure. Accordingly, the environmental control system 200 can be installed into two separate volumes on an aircraft (e.g., in two separate bays) as compared to a single large volume.

Figure 3:
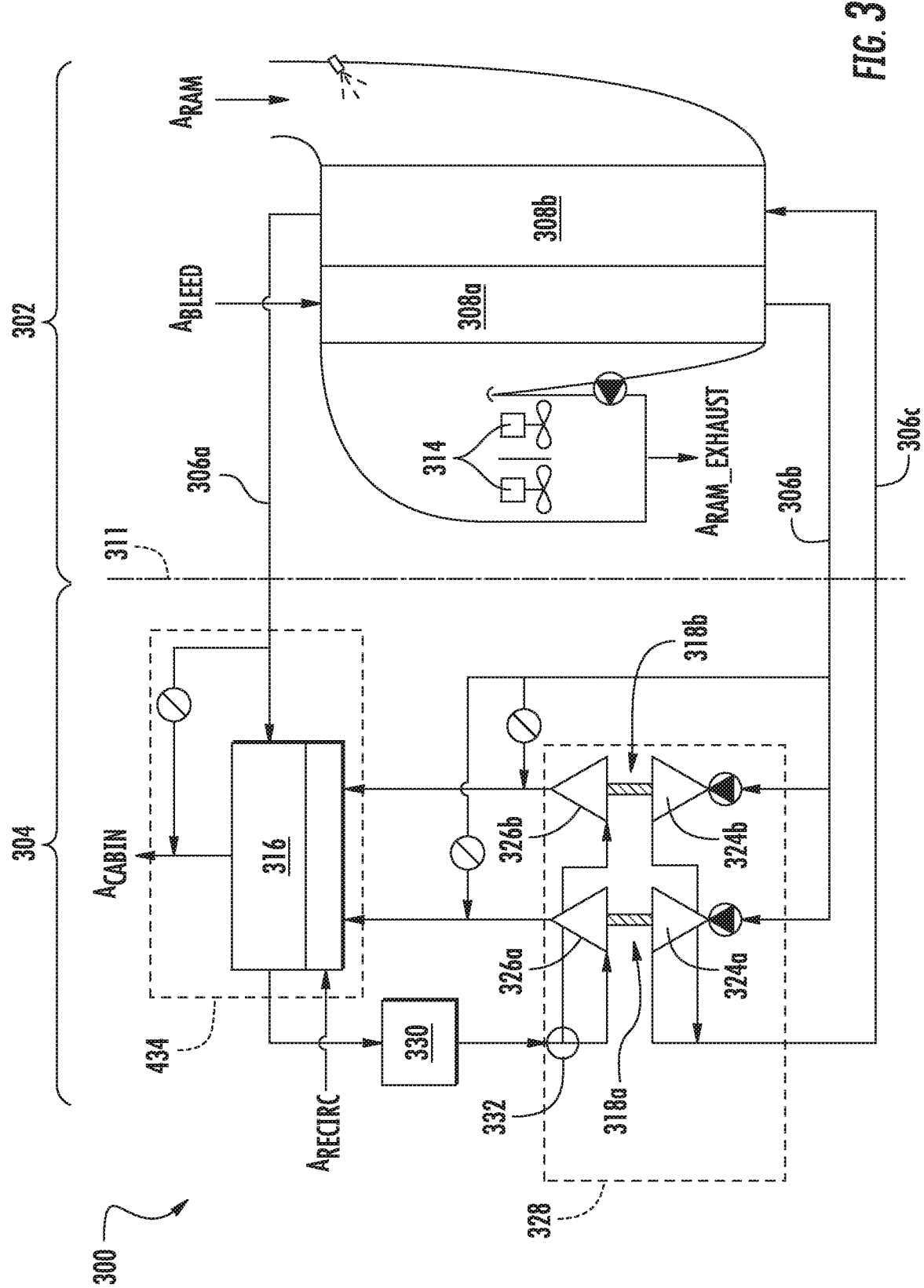
FIG. 3 is a schematic diagram of an environmental control system in accordance with an embodiment of the present disclosure.

For example, turning now to FIG. 3, a schematic diagram of an environmental control system 300 in accordance with an embodiment of the present disclosure is shown. The environmental control system 300 may be similar to that shown and described in FIGS. 2A-2B, and thus like features will not be described again.

The environmental control system 300 includes a ram module 302 and a refrigeration module 304. In some configurations, when installed on an aircraft, the ram module 302 can be installed into a right-hand side of the aircraft, and thus through a first bay door and the refrigeration module 304 can be installed into a left-hand side of the aircraft, and through a second bay door. In FIG. 3, an aircraft centerline 311 is indicated as separating the ram module 302 from the refrigeration module 304.

The ram module 302 is operably connected to the refrigeration module 304 by one or more ducts 306. The environmental control system 300 includes a primary heat exchanger 308a and a secondary heat exchanger 308b that receive bleed air $A_{bleed}$ and ram air $A_{ram}$, respectively, to condition air within the ram module 302. One or more ram fans 314 are configured to aid in exhausting ram exhaust air $A_{ram\_exhaust}$ from the ram module 302.

As shown, the refrigeration module 304 includes a condenser heat exchanger 316 and tandem air cycle machines 318a, 318b. Each of the tandem air cycle machines 318a, 318b includes a respective compressor 324a, 324b and a respective turbine 326a, 326b. The tandem air cycle machines 318a, 318b can form a tandem air cycle machine module 328, as indicated by the dashed-line box in FIG. 3. The tandem air cycle machine module 328 can include two air cycle machines (e.g., 318a, 318b) that are operably connected to a centralized manifold, as described herein, and thus form a compact, unitized assembly. Although shown and described herein with two air cycle machines 318a, 318b, those of skill in the art will appreciate that embodiments of the present disclosure can be applied to two, three, or four wheel tandem air cycle machines. As shown, a water collector 330 is configured to extract moisture from air of the condenser 316 and supply the conditioned air to the air cycle machines 318a, 318b. An air cycle machine isolation valve 332 is schematically shown that is configured to be operated and control fluid flow into one or both of the air cycle machines 318a, 318b. In some embodiments air cycle machine isolation valve 332 can be configured to isolate a failed air cycle machine, while maintaining proper and/or adequate operation of the environmental control system 300.

Also shown in FIG. 3, the refrigeration module 304 can be separated into multiple submodules. For example, the tandem air cycle machine module 328 can be separated from a condenser heat exchanger module 334 that includes the condenser heat exchanger 316 and associated components.

Embodiments provided herein are directed to improved pack-and-a-half environmental control systems. Architectures as provided herein can enable an integrated low pressure system that offers improved economic and operational performance superior to other architectures. Moreover, embodiments provided enable reduced system part count, weight, and interfaces that can be realized over conventional two-pack architectures. For example, in various embodiments, architectures provided herein may require only one instead of two of the following components: ram heat exchangers; condenser heat exchangers; water collectors; air cycle machine isolation valves; or ram circuits.

Figure 4:
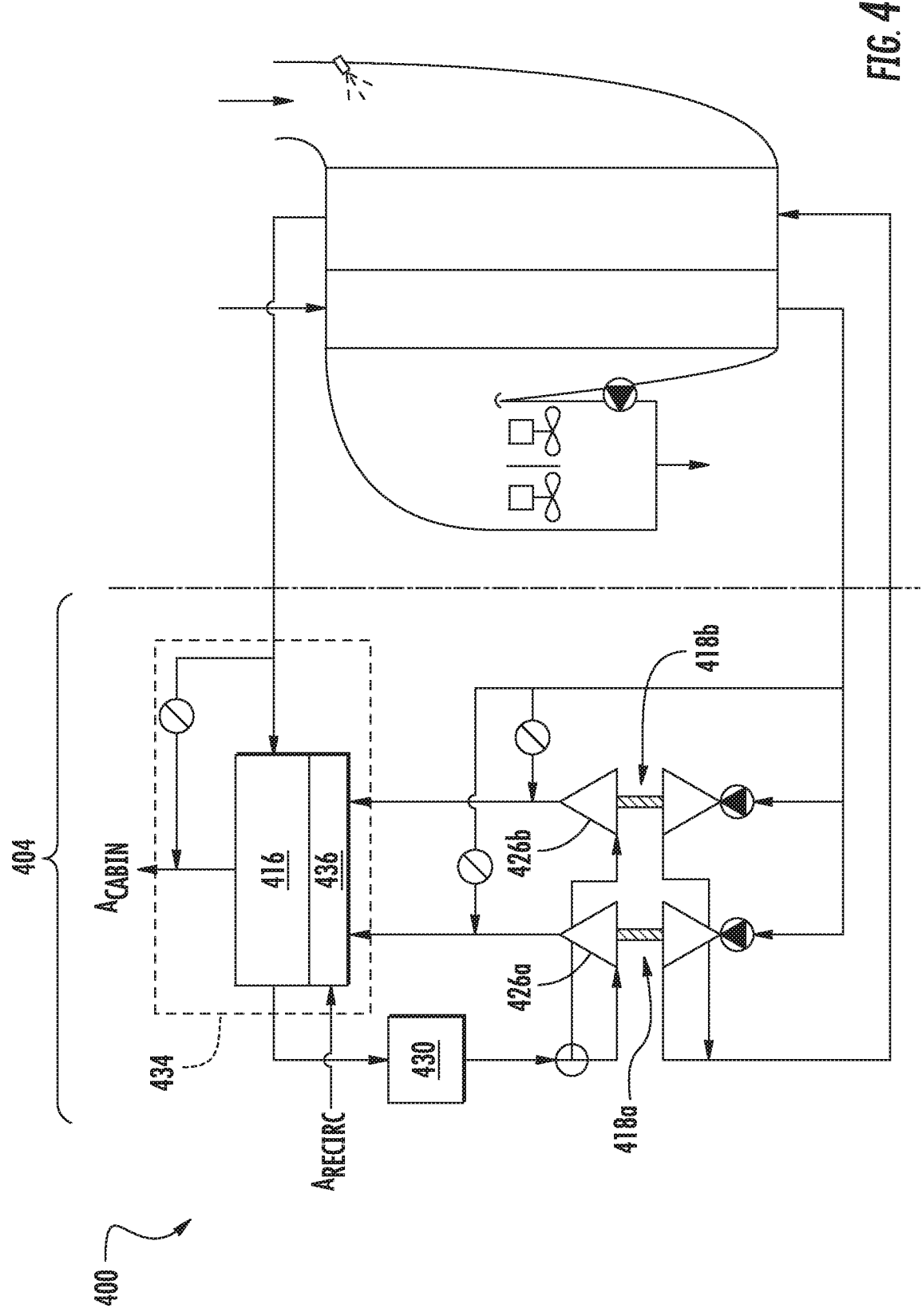
FIG. 4 is a schematic diagram of an environmental control system in accordance with another embodiment of the present disclosure.
Figure 5:
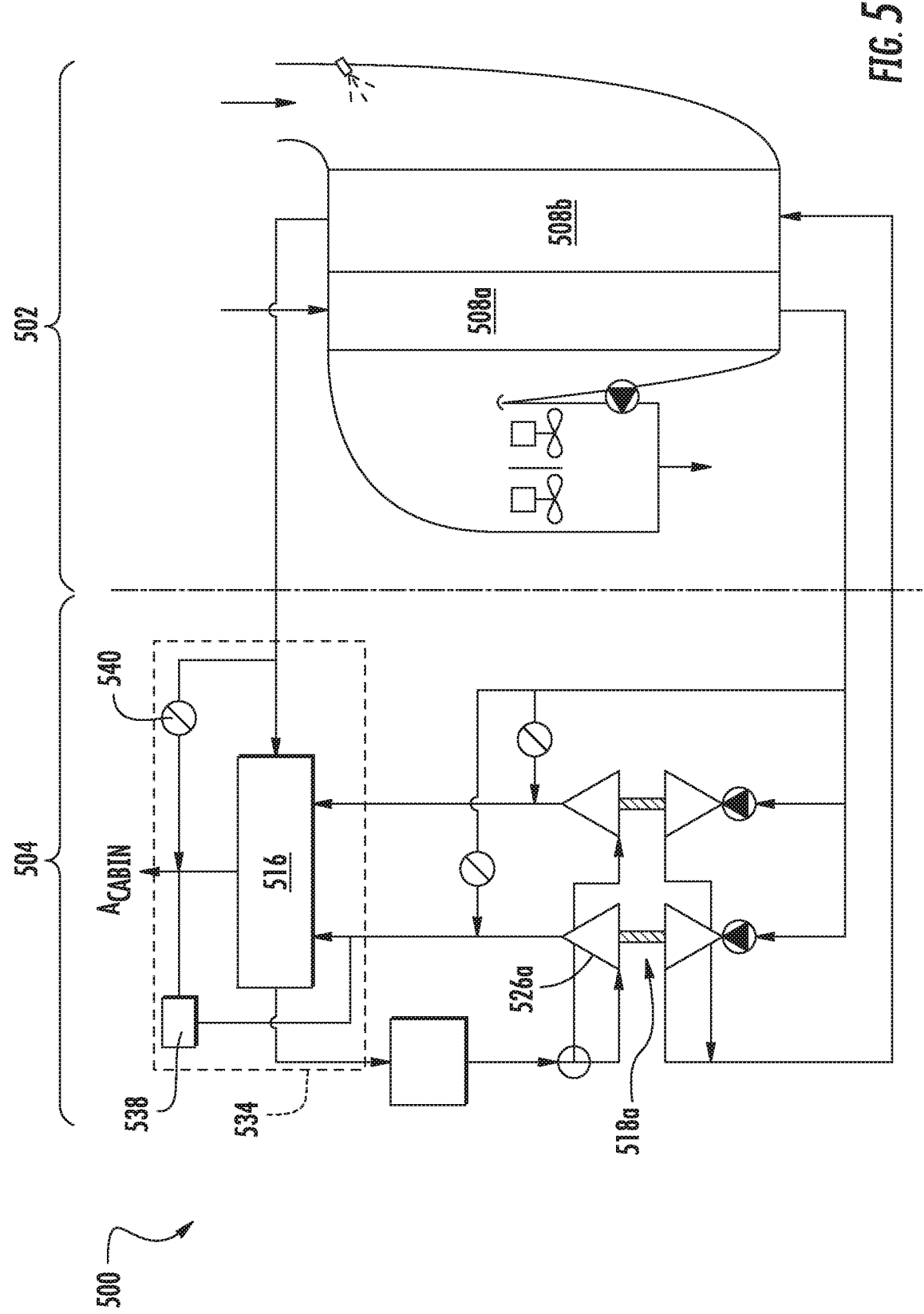
FIG. 5 is a schematic diagram of an environmental control system in accordance with another embodiment of the present disclosure.
Figure 6:
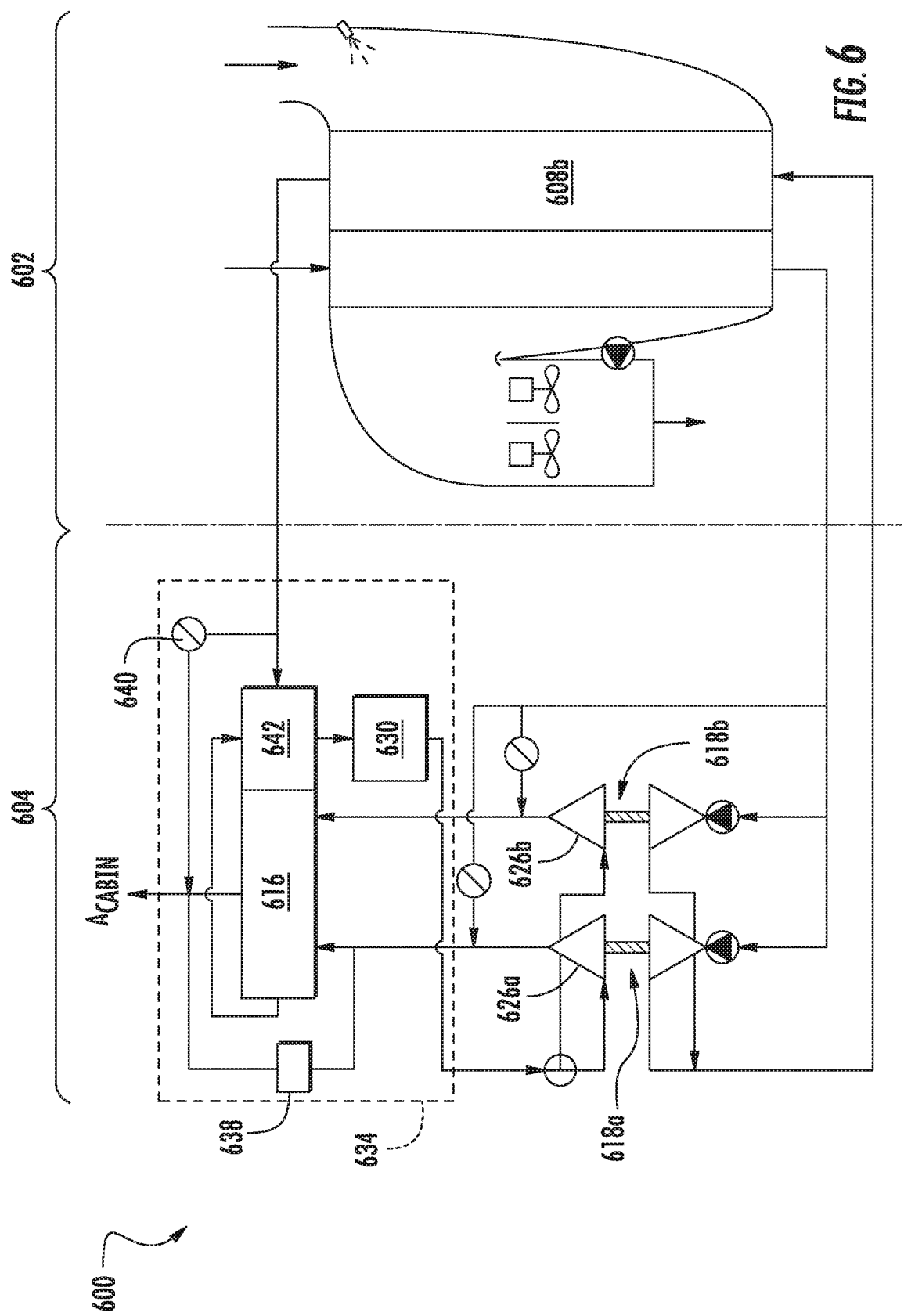
FIG. 6 is a schematic diagram of an environmental control system in accordance with another embodiment of the present disclosure.

Turning to FIGS. 4-6, various schematic illustrations of configurations of condenser heat exchanger modules in accordance with the present disclosure are shown. In each of FIGS. 4-6, the respective environmental control systems are similar to that shown and described with respect to FIG. 3, and thus various features will not be described again.

As shown in FIG. 4, a schematic diagram of an environmental control system 400 in accordance with an embodiment of the present disclosure is shown. In contrast to the above description regarding the environmental control system and particularly the refrigeration module, the environmental control system 400 includes a refrigeration module 404 having a condenser heat exchanger submodule 434 having a compact mixer 436 operably connected to a condenser heat exchanger 416. As shown, the compact mixer 436 can receive recirculated air $A_{recirc}$ from a cabin of the aircraft along with air passed through or supplied from turbines 426a, 426b of tandem air cycle machines 418a, 418b of the environmental control system 400, which can pass through a water collector 430. The compact mixer 436 can be configured to enable improved air conditioning for cabin supply air $A_{cabin}$. For example, the compact mixer 436 can enable mixing of recirculated air $A_{recirc}$ and conditioned air from the turbines 426a, 426b. In some embodiments, the compact mixer 436 can provide heat exchange capability to provide a desired thermal temperature within the condenser heat exchanger 416 and provide an efficient thermal treatment of the cabin air $A_{cabin}$.

Turning now to FIG. 5, an alternative configuration of an environmental control system in accordance with an embodiment of the present disclosure is schematically illustrated. In FIG. 5, the environmental control system 500 includes a refrigeration module 504 with a condenser heat exchanger submodule 534 having a differential pressure sensor 538. The differential pressure sensor 538 is configured to monitor a pressure differential between air output from a turbine 526a of an air cycle machine 518a of the environmental control system 500 and the cabin supply air $A_{cabin}$ as it leaves the condenser heat exchanger 516. Also shown in FIG. 5, an optional bypass valve 540 is shown. The bypass valve 540, in some embodiments, is configured to selectively control airflow supplied to the condenser heat exchanger 516. For example, in one non-limiting embodiment, the bypass valve 540 is configured to selectively control flow from a secondary heat exchanger 508b of the ram module 502 of the environmental control system 500. In operation, the bypass valve 540 can direct air directly from the secondary heat exchanger 508b directly to the cabin of an aircraft as cabin supply air $A_{cabin}$. Those of skill in the art will appreciate that the bypass valve 540 be configured in other ways. For example, the bypass valve 540, in some embodiments, can control air flow from one or both heat exchangers 508a, 508b of the ram module 502 to the cabin of the aircraft.

Turning now to FIG. 6, another alternative configuration of an environmental control system in accordance with an embodiment of the present disclosure is schematically shown. The environmental control system 600 of FIG. 6 includes a condenser heat exchanger submodule 634 having a condenser heat exchanger 616, a differential pressure sensor 638, a bypass valve 640, a reheater 642, and a water collector 630. In some embodiments, the reheater 642 is a heat exchanger that enables thermal energy exchange between air entering the condenser heat exchanger 616 and air exiting the condenser heat exchanger 616, as illustratively shown. That is, an inlet to the reheater 642 can be sourced from a secondary heat exchanger 608b of a ram module 602 of the environmental control system 600. The outlet of the reheater 642 can be directed to the water collector 630 which can then supply conditioned air to turbines 626a, 626b of air cycle machines 618a, 618b, as described above.

Those of skill in the art will appreciate that various of the above describe features and/or components of certain embodiments can be configured with features of other embodiments without departing from the scope of the present disclosure. For example, in some embodiments, features from the embodiments of any of FIGS. 3-6 can be interchanged, substituted, and/or combined without departing from the scope of the present disclosure.

Figure 7:
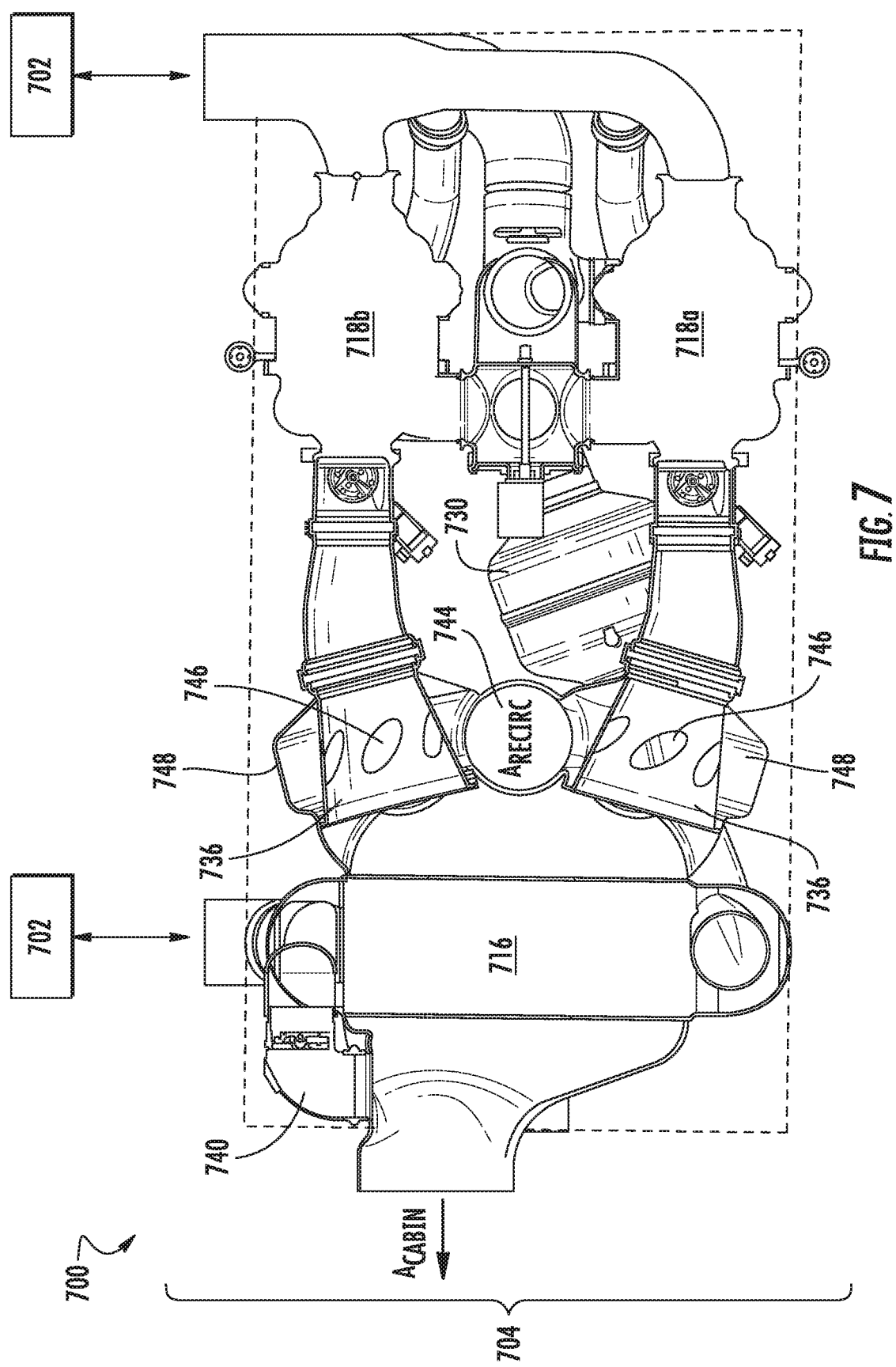
FIG. 7 is a schematic cross-section illustrational of a refrigeration module of an environmental control system in accordance with an embodiment of the present disclosure.

Turning now to FIG. 7, a schematic, cross-sectional illustration of a refrigeration module 704 of an environmental control system 700 in accordance with an embodiment of the present disclosure is shown. The refrigeration module 704 is configured similar to that shown in FIG. 4, and includes a condenser heat exchanger submodule having a condenser heat exchanger 716, a bypass valve 740, and a compact mixer 736. The refrigeration module 704 can be operably connected to a ram module 702 and also includes a water collector 730, as shown As shown the compact mixer 736 receives air to be mixed from air cycle machines 718a, 718b and from recirculated air $A_{recirc}$ (e.g., from a cabin of an aircraft). The recirculated air $A_{recirc}$ enters the compact mixer 736 through a recirculated air inlet 744. The compact mixer 736 can be configured with one or more recirculated air injectors 746. The recirculated air injectors 746 can inject the recirculated air $A_{recirc}$ to mix with air from turbines of the air cycle machines 718a, 718b within a mixer torus 748 of the compact mixer 736. As shown in the embodiment of FIG. 7, there are two mixer tori 748, although a single mixer torus unit or more mixer tori could be used without departing from the scope of the present disclosure.

Turning now to FIG. 8, another feature of environmental control systems of the present disclosure is schematically shown. FIG. 8 illustrates a detailed view of a ram module 802 of an environmental control system 800. As shown, similar to that described above, the ram module 802 includes a primary heat exchanger 808a, a secondary heat exchanger 808b, a ram outlet header 810 and a ram exhaust header 812. Located between the ram outlet header 810 and the ram exhaust header 812 are two fans 814. The fans 814 are configured to pull air through the ram module 802 and to exhaust the air out of the ram module 802 through the ram exhaust header 812 during ground operation. As shown in FIG. 8, the ram exhaust header 812 can include an optional fan bypass check valve 850 to reduce the ram circuit flow impedance in flight. The fan bypass check valve 850 opens in flight when there is a sufficient ram pressure differential for the flappers to open, bypassing the two fans 814. The fan bypass check valve 850 can be included to enable integration with various other systems of an aircraft, as needed.

Although shown and described herein with specific examples, the present examples are not intended to be limiting, and variations, changes, alterations, etc. can be made without departing from the scope of the present disclosure. For example, with respect to the ram module, the position of the fans can be changed such that they are upstream of the heat exchangers, rather than downstream as shown in the illustrations. Further, in some embodiments, the fans can be replaced with bleed ejectors. Furthermore, a single ram inlet and a single ram outlet can be employed with various embodiments and ram door actuators can be configured to utilize dual motors for improved dispatch reliability.

Further, although shown with the ram module and the refrigeration module oriented in a specific manner, those of skill in the art will appreciate that other orientations are possible. For example, in an aircraft with left-hand and right-hand service doors of bays of the aircraft, the ram module can be installed in either of the right-hand side or the left-hand side, such that noise can be minimized at the service doors.

Advantageously, embodiments provided herein are directed to pack-and-a-half environmental control systems with separate ram fans (e.g., ram module) and air cycle machines (e.g., refrigeration module) which allows environmental control systems to be installed in two separate volumes versus a single larger volume (e.g., in underwing pack bays of aircraft). Further, as noted above, the refrigeration module is, in some embodiments, configured as two sub-modules which can facilitate mounting into an aircraft (e.g., condenser heat exchanger module 334 and a tandem air cycle machine module 328).

Further, advantageously in accordance with various embodiments of the present disclosure, dual ram fans can be configured to provide ram cooling performance and redundancy. In some embodiments, the ram fans (e.g., fans 214) can be electric ram fans. Further, in various embodiments, one- or two-fan operation can be used to vary ram flow. Moreover, in various embodiments, fixed speed, two speed, and/or variable speed fans can be used. Additionally, two-position turbine nozzles can be employed within the various turbines of the air cycle machines to enable optimum ground and flight performance.

In some embodiments, the ram module can be installed in a bay opposite to aircraft service points, which can thus reduce ground crew exposure to ram noise. Also, ram inlet and outlet positions can be swapped or otherwise adjusted to provide performance advantages to aircraft operation. In various embodiments, a quench valve can be provided to supply cool air to a compressor inlet when bleed inlet air temperatures need to be tempered to a level to permit the use of lightweight materials (e.g., aluminum) in the system.

Additional valves (e.g., altitude valves, altitude diverter valves, etc.) can be used to reconfigure the pack-and-a-half system architecture for low impedance (e.g., a fuel saving mode). Various embodiments can include temperature control valves that are configured to regulate turbine outlet temperatures.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. An environmental control system for an aircraft, the environmental control system comprising:
    a ram module having a primary heat exchanger and a secondary heat exchanger;
    a refrigeration module having an air cycle machine module and a condenser heat exchanger module, wherein the condenser heat exchanger module includes a condenser heat exchanger and a differential pressure sensor configured to monitor a pressure differential between air supplied from the turbines of the air cycle machine module and air supplied to a cabin of the aircraft; and
    at least one conduit fluidly connecting the ram module to the refrigeration module such that the ram module and the refrigeration module can be installed in two separate volumes of the aircraft.

2. The environmental control system of claim 1, wherein the condenser heat exchanger includes a bypass valve that is selectively operable to divert air from the secondary heat exchanger directly to a cabin of the aircraft.

3. The environmental control system of claim 1, wherein the condenser heat exchanger conditions air received from turbines of the air cycle machine module to supply the conditioned air to a cabin of the aircraft.

4. The environmental control system of claim 3, wherein the condenser heat exchanger module includes a recirculated air inlet to receive recirculated air from the cabin of the aircraft and mixes the recirculated air with air from the turbines of the air cycle machine module.

5. The environmental control system of claim 4, wherein the condenser heat exchanger module includes compact mixer configured to mix the recirculated air and the air from the turbines of the air cycle machine module.

6. The environmental control system of claim 5, wherein the compact mixer includes recirculated air injectors and at least one torus to mix the recirculated air and the air from the turbines of the air cycle machine module.

7. The environmental control system of claim 1, wherein the ram module comprises at least one fan configured to control airflow through the primary and secondary heat exchangers of the ram module.

8. The environmental control system of claim 7, wherein the at least one fan is an electric fan.

9. The environmental control system of claim 7, wherein the at least one fan is one of a fixed speed, a two speed, or a variable speed fan.

10. The environmental control system of claim 7, wherein the ram module comprises at least one fan bypass check valve to enable air to bypass the at least one fan.

11. An aircraft comprising:
    an environmental control system including:
        a ram module having a primary heat exchanger and a secondary heat exchanger;
        a refrigeration module having an air cycle machine module and a condenser heat exchanger module, wherein the condenser heat exchanger module includes a condenser heat exchanger and a differential pressure sensor configured to monitor a pressure differential between air supplied from the air cycle machines and air supplied to a cabin of the aircraft; and
        at least one conduit fluidly connecting the ram module to the refrigeration module such that the ram module and the refrigeration module can be installed in two separate volumes of the aircraft.

12. The aircraft of claim 11, wherein the condenser heat exchanger includes a bypass valve selectively operable to divert air from the secondary heat exchanger directly to a cabin of the aircraft.

13. The aircraft of claim 11, wherein the condenser heat exchanger conditions air received from turbines of the air cycle machine module to supply the conditioned air to a cabin of the aircraft.

14. The aircraft of claim 13, wherein the condenser heat exchanger module includes a recirculated air inlet to receive recirculated air from the cabin of the aircraft and mixes the recirculated air with air from the turbines of the air cycle machine module.

15. The aircraft of claim 14, wherein the condenser heat exchanger module includes compact mixer configured to mix the recirculated air and the air from the turbines of the air cycle machine module.

16. The aircraft of claim 11, wherein the ram module comprises at least one fan configured to control airflow through the primary and secondary heat exchangers of the ram module.

17. The aircraft of claim 16, wherein the at least one fan is one of a fixed speed, a two speed, or a variable speed fan.

18. The aircraft of claim 16, wherein the ram module comprises at least one fan bypass check valve selectively openable to enable air to bypass the at least one fan.

* * * * *